United States Patent [19]
Murray

[11] 3,757,386
[45] Sept. 11, 1973

[54] HOLDER FOR FISH CLEANING

[76] Inventor: Douglas W. Murray, 2028 Russell Ave., Baltimore, Md. 21207

[22] Filed: Feb. 4, 1972

[21] Appl. No.: 223,679

[52] U.S. Cl. .................................................. 17/70
[51] Int. Cl. ............................................ A22c 25/00
[58] Field of Search ............................... 17/70, 44.3

[56] References Cited
UNITED STATES PATENTS
2,757,951  8/1956  Benton.................................... 17/70

OTHER PUBLICATIONS
Popular Mechanics 10–1946.

Primary Examiner—Louis G. Mancene
Assistant Examiner—D. L. Weinhold
Attorney—John F. McClellan, Sr.

[57] ABSTRACT

A fish holder and positioner especially adapted for scaling operations, gutting, beheading and the like and for easy, thorough cleaning thereafter, through provision of opposed, toothed jaws integral with a unitary body composed of a handle-shaped, single compressed loop of flat spring material narrower than the jaws holding the jaws in normally closed position, with the looped end of the body having a special swivel attachment to a board or the like. In use, extra pressure can be applied to the jaws by squeezing the handle or by pressure applied to force the jaws or handle against the surface to which mounted; the handle is flared to provide access for easy separation to release the grip of the jaws and the teeth of the jaws are specially shaped to avoid severing.

4 Claims, 5 Drawing Figures

PATENTED SEP 11 1973 3,757,386

HOLDER FOR FISH CLEANING

This invention relates generally to holding and positioning devices, and specifically to devices for holding fish for cleaning.

Although this invention is described as a holder for cleaning fish it will be appreciated that the uses are not limited to fish holding and positioning, but that the device is adapted for holding and positioning a variety of small game for cleaning, skinning, plucking and other preparations.

Various devices for the purpose appear in the prior art, including toothed holders in co-acting attachment to boards, but no device has found a place as the standard of commerce for the purpose, apparently because of various limitations of the designs.

Primary objects of the present invention are to overcome and avoid prior limitations, and to provide a fish holder which is at the same time more convenient to use, more sanitary, safer and more reliable, more durable, more attractive in appearance, and more economical than devices previously available for the purpose.

These objects are realized in preferred embodiment in a unitary, flat spring handle and jaw member having swivel attachment to a working surface.

The above and other advantages and objects of the invention will become more readily appreciated on reference to the following description, including the drawings, in which.

In the Figures, like numbers indicate like parts.

Describing the Figures in detail.

Figure 1:
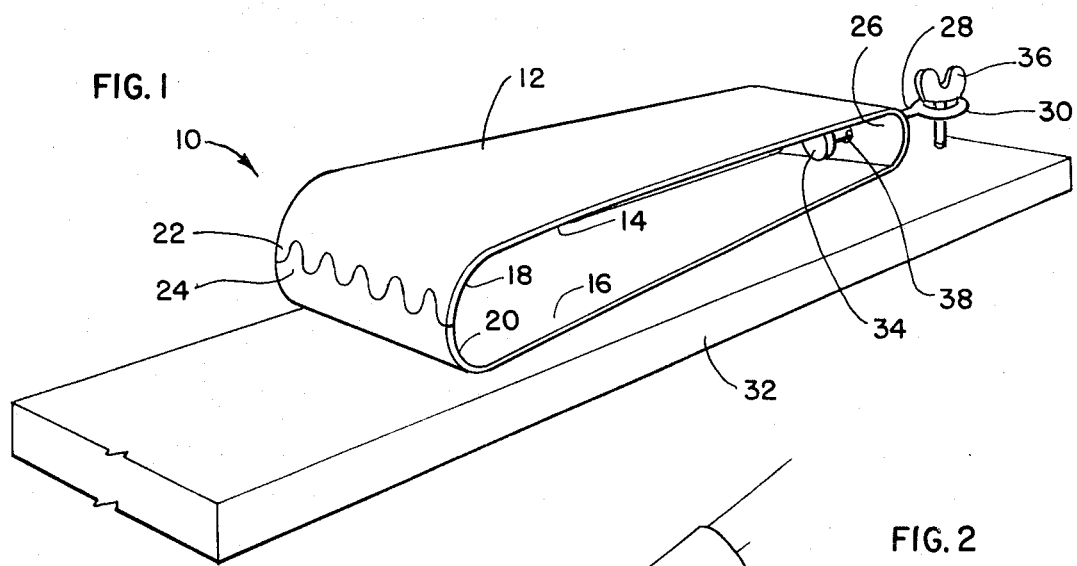
FIG. 1 is a perspective view of the fish holder in preferred embodiment.

FIG. 1 shows the invention 10 in perspective, with the clamp 12 connected by swivel shank 28, eye 30, and wing screw 36 to board 32.

The clamp 12 consists preferably of a unitary piece of flat spring material having sets of teeth 22, 24 across the free ends 18, 20. The clamp is formed into the shape of a compressed single loop having relatively straight handle portions 14, 16 connected by a curved portion 26 between them and curved toward each other at the free ends so that the toothed ends meet.

The swivel members consist of a rod like shank 28 connecting the handle of the clamp with a screw 36 in the board 32 or other structure to which the device is attached. The rod has a screw eye 30 on one end engaging the screw 36 and an upset head 34 on the other end securing the rod to the curved portion 26 of the handle by means of hole 38 which the rod fits freely.

The clamp may be of stainless steel or plated spring steel, and the swivel structure may be of stainless steel, plated steel, or other suitable material.

Figure 2:
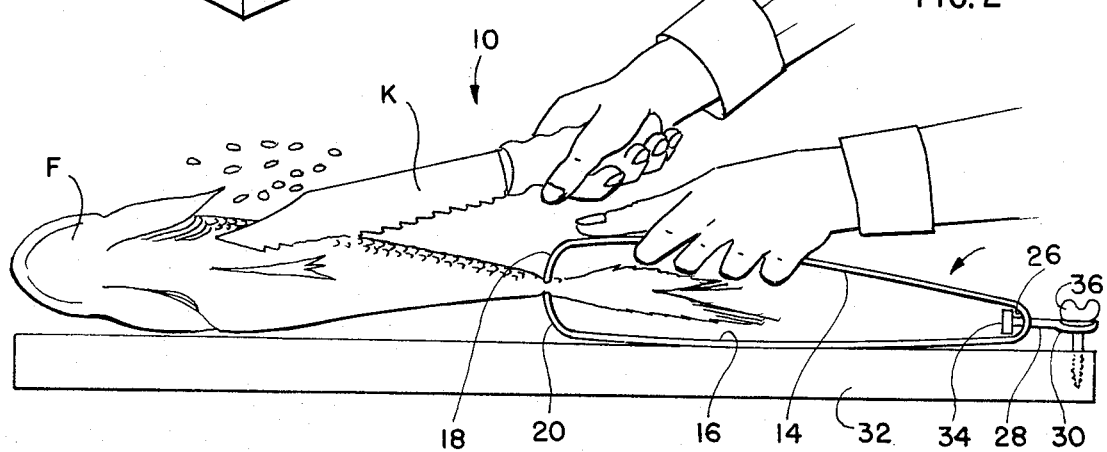
FIG. 2 is a side elevation of the invention in use.

FIG. 2 shows the invention in use. In the Figure, fish F is being held by the tail in the clamp while the scales are removed manually using a knife K or other suitable scraping instrument. The weight of spring-stock used is chosen to be sufficient to hold the fish securely under normal conditions. However, as indicated in FIG. 2, the shape and disposition of the parts of this invention allows extra holding force to be applied by squeezing the handles together in the user's hand, or alternatively and preferably as shown, merely by pressing the clamp against the board. When one side of the fish is cleaned, it is flipped over, as allowed by the swivel structure, and the other side is cleaned.

Figure 3:
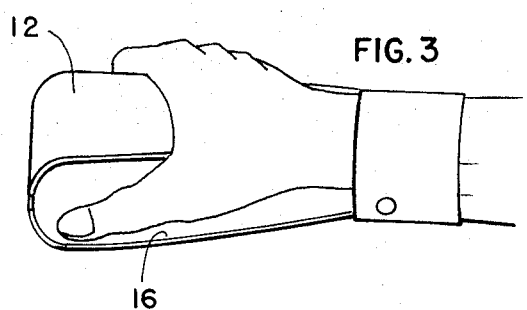
FIG. 3 is a perspective view showing provision for separation of the jaws of the holder.

FIG. 3 shows the provision for releasing the grip of the clamp. The handles of the clamp are spaced apart sufficiently in the closed position to permit insertion of the user's fingers between them. By gripping the top handle 12 and pressing against the bottom handle 16 with the thumb in this manner, the user can easily release the clamp using only one hand. The extra width of the clamp at the jaw end especially facilitates this operation.

Figure 4:
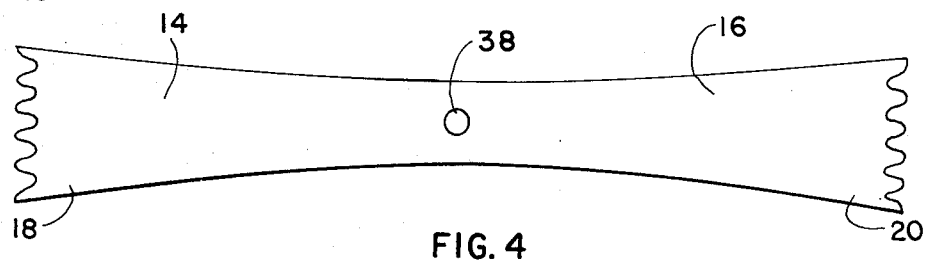
FIG. 4 is a layout of a unitary jaw and handle structure prior to forming.

FIG. 4 is a plan layout of the clamp before it is formed into the loop shape indicating the simplicity and economy of the construction, which tapers from a relatively narrow midbody to relatively wide jaws 18 and 20 at the ends.

It will be seen that the clamp as a whole has no sharp folds or other traps for refuse, but is openly curved, making it very easy to clean, safe and pleasant to use, and attractive in appearance. Further, the swivel structure is completely exposed for cleaning.

Because of the screw eye attachment provided in the swivel, it can readily be screwed, or bolted to any board or to other suitable structure such as the gunwale of a boat, either permanently, or detachable so that the metal parts can be dunked for cleaning and stored inside when not in use. The screw fits the bolt loosely, providing a universal joint action which, together with the swivel action of the rod in the handle gives the required freedom of action while maintaining a safe, secure attachment. At the same time, the normally closed feature makes the jaws of the clamp maintain a safe, secure grip on fish being cleaned.

These features minimize the possibility that fish being cleaned will accidentally shift in position allowing knife slippage which might cause injury to the user.

Figure 5:
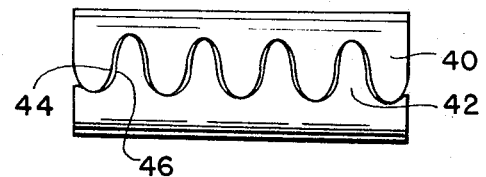
FIG. 5 is an end view showing tooth details in preferred embodiment.

FIG. 5 is an end view showing a preferred tooth form, instead of the opposed-tip configuration of FIG. 4. The teeth 40 of the upper jaw are tapered and fit between the teeth 42 of the lower jaw which are also tapered with clearances at the midportions 44, 46 of the teeth. The clearances insure that no matter how much pressure is applied, the complementary jaws hold securely, never completely severing material held.

Obviously many modifications and variations of the present invention are possible in light of the above teachings. It is, therefore, to be understood that within the scope of the appended claims the invention may be practiced otherwise than as specifically described.

What is claimed and desired to be secured by Unted States Letters Patent is:

1. A holder for cleaning fish comprising a unitary clamp of flat spring stock having ends in the shape of toothed jaws, the clamp having the form of a compressed loop with the toothed jaws normally closed in opposed relation at one end and the other end a continuous recurved portion, a universal swivel engaging the recurved portion of the clamp including a rod freely engaging a hole in the recurved portion of the clamp, the rod having an enlargement at one end for retention in the hole and an eyelet at the other end for engaging the means for securing the swivel to external structure, and means for securing the swivel to external structure.

2. A holder for cleaning fish as recited in claim 1, wherein the jaws of the clamp are relatively wider than the remainder thereof.

3. A holder as recited in claim 2, wherein all portions of the clamp are openly curved thereby adapting it for cleaning and visual inspection of all areas.

4. A holder as recited in claim 3, wherein the means for attachment to external structure comprises a threaded rod fastener.

* * * * *